(12) United States Patent
Cole (10) Patent No.: US 7,019,632 B2
(45) Date of Patent: Mar. 28, 2006

(54) VEHICLE BRAKING SIGNAL SYSTEM WITH VARYING AREA DISPLAY

(76) Inventor: George Stuart Cole, 793 Nash Ave., Menlo Park, CA (US) 94025

( * ) Notice: Subject to any disclaimer, the term of this patent is extended or adjusted under 35 U.S.C. 154(b) by 327 days.

(21) Appl. No.: 10/217,586

(22) Filed: Aug. 12, 2002

(65) Prior Publication Data

US 2003/0030555 A1 Feb. 13, 2003

Related U.S. Application Data

(60) Provisional application No. 60/311,898, filed on Aug. 13, 2001.

(51) Int. Cl.
*B60Q 1/44* (2006.01)

(52) U.S. Cl. ........................ 340/479; 340/467
(58) Field of Classification Search ................ 340/479, 340/475, 467
See application file for complete search history.

(56) References Cited

U.S. PATENT DOCUMENTS

| | | | |
|---|---|---|---|
| 4,556,862 A * | 12/1985 | Meinershagen | ............. 340/478 |
| 4,983,953 A | 1/1991 | Page | |
| 5,059,947 A | 10/1991 | Chen | |
| 5,089,805 A | 2/1992 | Salsman | |
| 5,139,115 A * | 8/1992 | Browne et al. | ......... 188/1.11 E |
| 5,148,147 A | 9/1992 | Kobres | |
| 5,150,098 A | 9/1992 | Rakow | |
| 5,184,883 A * | 2/1993 | Finch et al. | ................ 362/511 |
| 5,211,466 A | 5/1993 | Jarocki et al. | |
| 5,231,373 A | 7/1993 | Freeman et al. | |
| 5,258,740 A | 11/1993 | Viano et al. | |
| 5,404,130 A | 4/1995 | Lee et al. | |
| 5,481,243 A | 1/1996 | Lurie et al. | |
| 5,499,009 A | 3/1996 | Davis | |
| 5,504,472 A * | 4/1996 | Wilson | ........................ 340/479 |
| 5,565,841 A | 10/1996 | Pandohie | |
| 5,594,416 A | 1/1997 | Gerhaher | |
| 5,717,377 A | 2/1998 | Giao | |
| 5,831,523 A * | 11/1998 | Lange | ........................ 340/479 |
| 6,054,919 A * | 4/2000 | Demko | ........................ 340/479 |
| 6,100,799 A * | 8/2000 | Fenk | ........................... 340/467 |
| 6,133,852 A * | 10/2000 | Tonkin | ........................ 340/903 |
| 6,150,933 A * | 11/2000 | Matsumoto | ................. 340/479 |
| 6,163,256 A * | 12/2000 | Brown | ....................... 340/479 |
| 6,259,992 B1 | 7/2001 | Urai et al. | |

(Continued)

OTHER PUBLICATIONS

Hyper-Lite; commercial LED brake light add-on kit for motorcycles; www/sampson-sporttouring.com/hyper-lite-bmw.html.

*Primary Examiner*—John Tweel, Jr.
(74) *Attorney, Agent, or Firm*—George S Cole (57) ABSTRACT

A vehicle's operator can signal both the intended relative braking effort, and changes thereto, using a signal with a proportionately scaled and reactive display. A sensor measuring the current proportionate intensity of the intended and applied braking effort is attached to a vehicle's braking system. This sensor sends a signal to the associated external display (which may comprise multiple, separated areas). Each display area then shows that portion of its area commensurate with, or proportional to, the intensity of the intended and applied braking effort. The sensor, signal, and display(s) regularly repeat this at rapid intervals, thereby keeping the display responsive to and in accordance with the current intended and applied braking effort. In one enhancement, the outer limit of the display is activated when any braking effort is made, to enable rapid evaluation by any viewer between the relative effort applied and the potential full effort.

13 Claims, 6 Drawing Sheets

U.S. PATENT DOCUMENTS

| | | |
|---|---|---|
| 6,267,194 B1 | 7/2001 | Bullinger et al. |
| 6,268,792 B1 | 7/2001 | Newton |
| 6,272,421 B1 | 8/2001 | Mertens |
| 6,273,218 B1 | 8/2001 | Kramer |
| 6,275,752 B1 | 8/2001 | Giers |
| 6,573,830 B1 * | 6/2003 | Cohen et al. ............... 340/479 |

* cited by examiner

VEHICLE BRAKING SIGNAL SYSTEM WITH VARYING AREA DISPLAY

CROSS-REFERENCE TO RELATED PROVISIONAL APPLICATIONS

This application claims the benefit of the provisional patent application 60/311,898 titled "Proportionately Variable Signal", filed on Aug. 13, 2001 by the same inventor.

STATEMENT REGARDING FEDERALLY SPONSORED RESEARCH OR DEVELOPMENT

Not Applicable

BACKGROUND OF THE INVENTION

1. Field of the Invention

This invention is in the field of vehicle signal systems meant for and sent to people outside a vehicle to indicate changes in the vehicle's motion intended by the vehicle's operator. More particularly, the preferred embodiment of this invention is in the field of braking signals of the braking effort by a vehicle's operator.

2. Description of the Related Art

Anyone sharing a road with one or more other vehicles—particularly when those vehicles have drivers from different cultures—quickly realizes that what the most wants to know is what the other drivers intend to do. Much of the stress of driving arises from needing to know other drivers' intentions, in order to predict their future behavior and react before it is too late, but not getting signals that allow such prediction. Particularly, much of the stress of driving in 'stop and go' traffic arises from not being able to accurately gauge the braking intentions of a preceding vehicle's driver or to signal changes in one's own braking effort to a following vehicle. All one can tell, and all one can indicate, is whether a driver is braking or not braking; but often, the question of import is whether a driver (whose brake lights are on) is braking harder, letting up, or maintaining a constant braking effort.

Because however much it helps to know what is happening to the other vehicle now, it is more important to know what probably will be happening in the future, particularly in the near future, when their behavior and yours may cause an (undesired) intersection. This places a great deal of emphasis on correctly comprehending any signal any other driver sends (and accurately sending a signal as to one's own behavior). Other, external cues (snow or rain falling, ice on the road, obstacles ahead, or the other vehicle's relative position and motion) can the perceived and judged directly as the other vehicle's present motion and position change. But a driver's intention and current effort (as distinct from the consequences of such effort) at present is poorly displayed. For example, a driver may be engaged in a hard braking effort, a medium braking effort, or a minimal braking effort, but only the fact that some braking effort is intended is displayed through the brake lights—which are the simplest, and most frequently misunderstood display. This need is particularly acute when, as at present in the United States, most vehicles on the road have automatic transmissions and so often apply their brakes not to slow the vehicle further, but to keep it from moving faster.

Under the present state of the art, brake signal systems (especially automobile brake signal systems) are strictly bi-modal; either they are off (no turn or braking is intended by the driver), or they are on. Many problems arise because this limited signal becomes overloaded.

Overloading can occur iii two ways. First, a signal may not adequately discriminate between differences; e.g. a signal (such as a set of brake lights) does not distinguish within the range of applied effort (e.g. does not signal differently for 'hard braking' and 'soft braking'). All braking efforts are signaled as if they were identical in intention and result, though the control actually permits a wide range of braking potential. This can cause a following driver to run into a preceding vehicle if the following driver fails to realize that the previously soft-braking driver has had to slam on his brakes hard, and the failing driver fails to change his behavior and to brake as bard as the preceding driver. (The opposite error, of confusing 'soft braking' with 'hard braking' may also cause an accident—but this time between a following driver who unnecessarily slams on his brakes and the vehicle behind himself.)

Second, a signal may stay constant through a changed effort and thereby prevent other, possibly subtler signals, from being perceived. E.g. initial soft braking that suddenly becomes hard may create an accident if the following driver believes in the unchanging nature of the braking signal over the changing visual (or aural) cues indicating a decrease in separation distance resulting from the change in braking effort.

There have been prior efforts to improve on brake signal systems. Chiefly these have focused on linking the mechanical (or, more recently, the electronic-and-mechanical) aspects of the physical activity of the vehicle braking to the brake display. The inventors sought to make the brake lights reflect the actual braking behavior of the vehicle. In doing so, however, they forget two key factors: first, a signal is sent to a human being not to tell him what is happening to the vehicle, but to indicate what the other human intends to happen in the future; and, second, that human drivers can take in much more of the context in which the signaling vehicle is operating (namely, the external environment) and integrate that knowledge with a signal of another driver's intentions, to more accurately predict what the other vehicle is probably going to do, than any single display reporting only a vehicle's current state can accurately provide. Each driver needs to know more about what others intend than what is happening, because his response depends on prediction and reaction both—and part of that prediction must involve predicting what the other drivers will be doing, too, as his own intentions and behavior change!

In U.S. Pat. No. 5,231,373, Freeman et. al. alter the intensity of brake lights to match the alterations in the vehicle's velocity. Much of that patent focuses on trying to accommodate the problems in interpreting intensity arising from differential human physiology—bluntly, the fact that different folks see changes iii light intensity differently. This invention does not assure that a change in intensity will be consistent across vehicles, or manufacturers, i.e. does not do so in a fashion which readily indicates to a following driver where in the spectrum of possible intensities the current signal is located. Since different manufacturers could have different intensities (base, minimum, maximum, or any combination thereof), or, more realistically, manufacture different vehicles with different intensities, and the real world could readily give to identical vehicles different intensities, because of the different conditions and maintenance they have experienced or received (for example, the amount of dust or pollen currently on the light's surface), any following driver has no ready means to relate the absolute value of the current intensity to the intended effort.

Moreover, it is far more difficult to determine relative intensity of a light display, than its physical size, even when not illuminated.

In U.S. Pat. No. 5,481,243, Lurie et. al. err in focusing on the behavior of the vehicle, rather than the intention of the driver. That invention has the same first flaw as Newton's, in focusing on the deceleration, rather than the braking effort, but it has a greater problem in that it defines deceleration by the change in the RPM of the vehicle's tires. Again, any "deceleration" caused by any reason is deemed to be intentional braking. Different types of errors can arise—for example, if the vehicle's tires cease to rotate, even though the vehicle is still moving, this would be read as a deceleration (and in fact, as a maximum deceleration). Which means that when the car ahead hits the ice or oil and skids, or water and hydroplanes, and the tires cease to rotate, the brake lights will go on at maximum—thereby increasing the probability that the driver behind, reading this as an intentional braking, will attempt to duplicate the effort, and brake at the worst possible moment, as he in turn hits the transient surface condition which caused the loss of traction. Another type of error this could cause is if the vehicle ahead is in loose traction (snow, ice, rain, sand, gravel, etc.) where the vehicle's tires are alternately slipping over the surface, and thereby increasing their rotational speed but decreasing the forward motion, and then gripping, and decreasing the rotational speed—and thereby signaling 'braking'—when in fact actual acceleration is taking place. Finally, this invention alters the intensity of the braking signal, as in Freeman, without resolving any of the aforementioned problems.

In U.S. Pat. No. 6,268,782, J. D. Newton teaches a device for signaling when deceleration increases. This invention contains several serious flaws. First, it confuses deceleration with braking. Going up a hill without adding pressure to the gam pedal will cause deceleration as will downshifting to a lower gear, or letting off on the gas pedal and being slowed by air resistance while shifting to a higher gear while continuing accelerating (the latter two may be more pronounced in a manual transmission). As a consequence, this invention would send a 'false positive' signal for each such deceleration indicating that the driver of the vehicle intended to brake. Second, this invention presumes that braking only increases—yet it often may be important to signal that braking is decreasing to avoid causing an overreaction. Third, since the invention requires learning a vehicle's maximum deceleration, it will automatically signal the maximum each time that the prior limit actually experienced is exceeded. This will create a false impression of reaching maximum deceleration too soon for any driver who does not put their car 'through the paces' and consciously practice a 'panic stop' (at some, and probably non-negligible cost to the tires, brake system, and nerves of the driver and surrounding citizenry) before taking it out onto the highway. This invention completely ignores the driver and leaves him with no role to play in signaling what he intends; it only signals what the vehicle is currently experiencing.

Driving is an analog art, control thereof is an analog effort, braking is an analog art, and brake signals should have an analog rather than a bimodal, binary display ('on' or 'off'). What is needed is an analog signal that responds to and displays the braking intensity attempted and intended, that serves as a signal of the driver's intentions, and that allows ready comparison to the minimal and maximal braking effort in an intuitive fashion. While no invention can solve the separate problem of a driver sending the wrong signal (signaling a left turn and turning right), the invention described below frees the current state of the art braking display from the unnecessarily rigid, two-valued limits of the present implementation, and makes the braking signal responsive to the intended braking effort.

SUMMARY OF THE INVENTION

A sensor is attached to the brake pedal of a vehicle. The sensor measures the proportionate intensity of the intended and applied braking effort (from none through the maximum possible). This sensor sends a signal to an external display associated with the braking system; the display may comprise multiple, separated displays. That display, or each subordinate display, then illuminates only a portion of its area commensurate with, or proportional to, the intensity of the intended and applied braking effort. The sensor, signal, and display repeat this behavior at rapid intervals so the external braking signal is responsive to and with changes with the intended and applied braking effort. In the preferred embodiment, the circumferential outer limit of a braking display is always differentially illuminated when any braking attempt is made, to enable rapid and intuitive comparative evaluation between the effort currently being applied (indicated by the interior, proportionate, illuminated area) and the potential full effort possible (indicated by the circumferential outer limiting display).

BRIEF DESCRIPTION OF THE DRAWINGS

FIG. 3 is a time-sequence 'snapshot' of a single braking display, going from minimal braking effort (FIG. 3A) to serious braking effort (FIG. 31) to moderate braking effort (FIG. 3C).

FIG. 5 is another time sequence 'snapshot' of a single braking display, using as an alternative means to vary the amount of illuminated central display a shutter, going from minimal braking effort (FIG. 5A) to serious braking effort (FIG. 5B) to moderate braking effort (FIG. 5C).

DETAILED DESCRIPTION OF THE DRAWINGS

Figure 1:
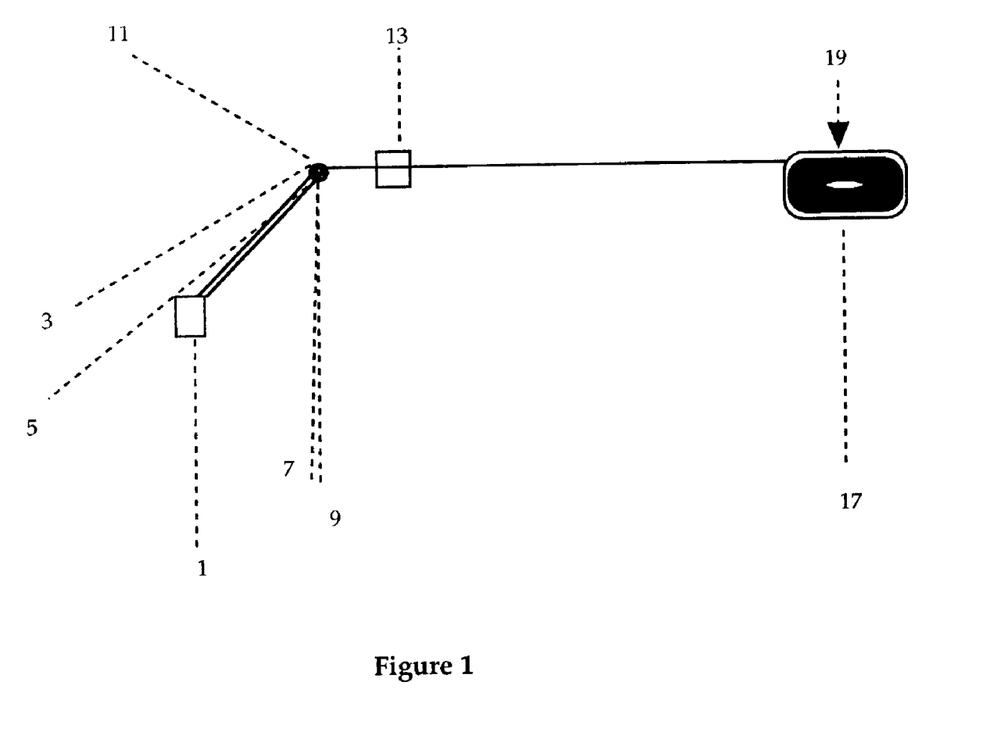
FIG. 1 is a system overview of the preferred embodiment.

FIG. 1 is a system overview of the preferred embodiment. A Brake Pedal (1) which when not used would be in the 'at rest' position (3) has been depressed by a driver (not shown) just over a minimum threshold limit of 5% (5), but less than the upper threshold of 95% (7) or the maximum possible (9). A sensor (11) which is attached to the pedal sends a signal through a logic circuit (13), which includes both memory for prior signal and comparative capability, and moderates the signal accordingly, down to the braking display (15). The outer, circumferential element of the display is illuminated as the braking effort exceeds the minimum threshold (17) and the inner display area is illuminated proportionately to the braking effort (19).

Figure 2:
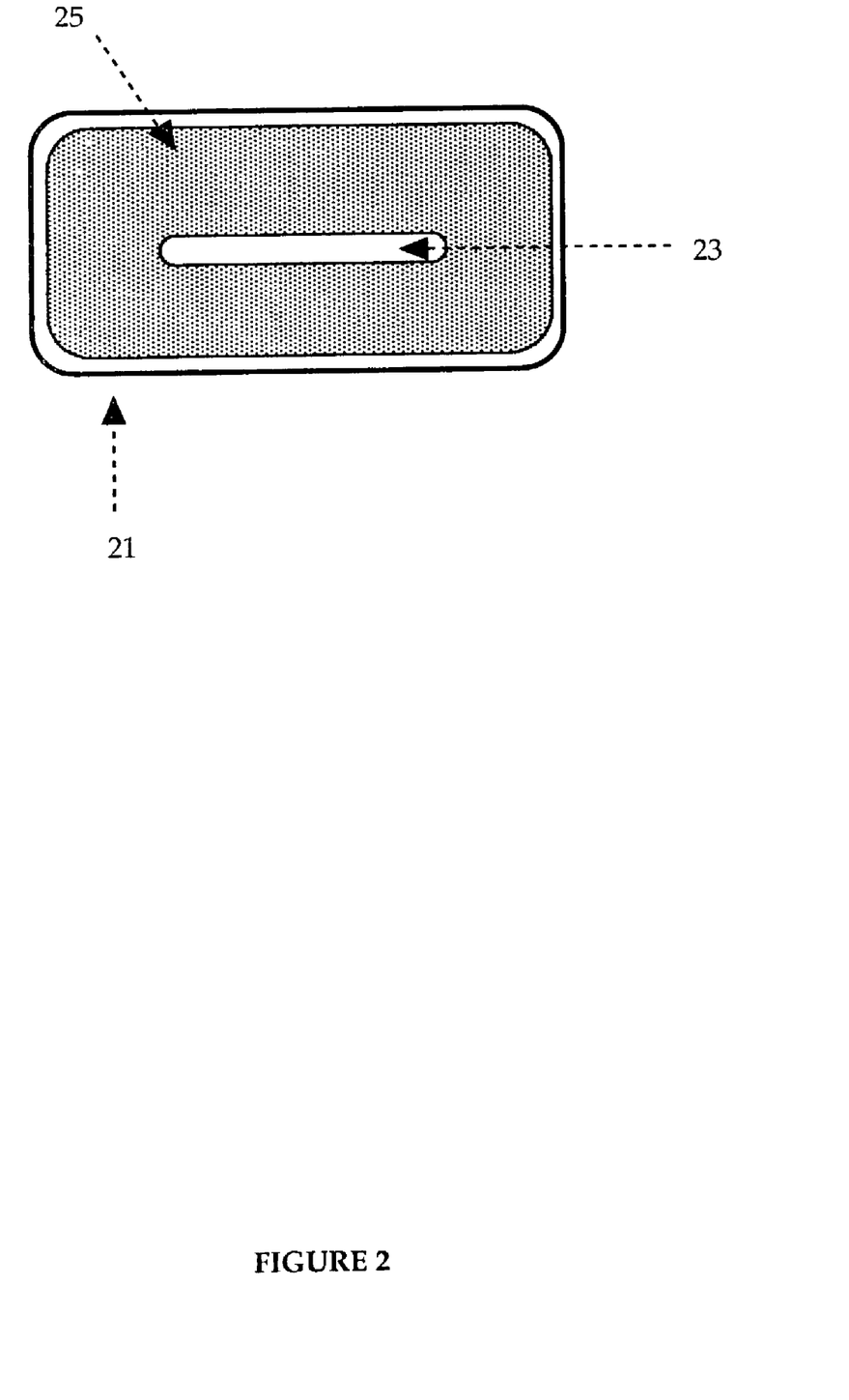
FIG. 2 is a larger-scale view of a single braking display.

FIG. 2 is a larger-scale view of a single braking display, showing the outer circumferential element (21) illuminated, indicating that some braking effort is intended, and showing that only a small amount of the inner display (23) is illuminated, while the majority remains dark (25), indicating that the braking effort is relatively small.

Figures 3A, 3B:
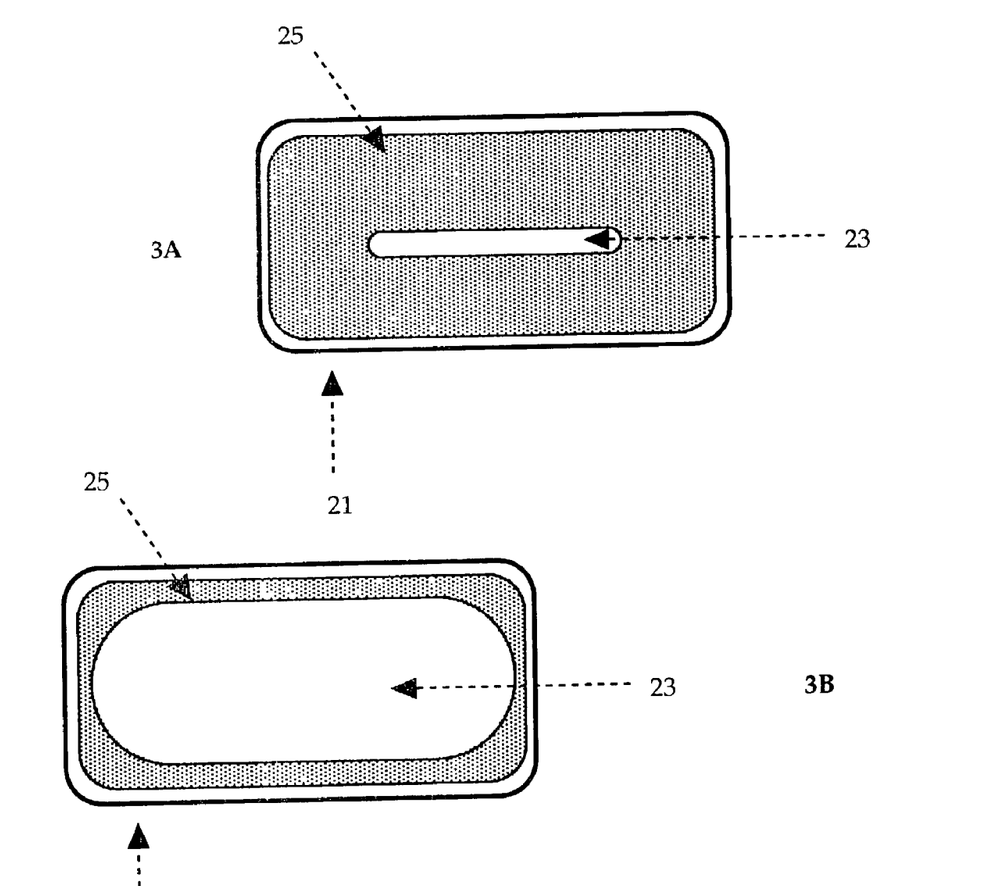
Figure 3C:
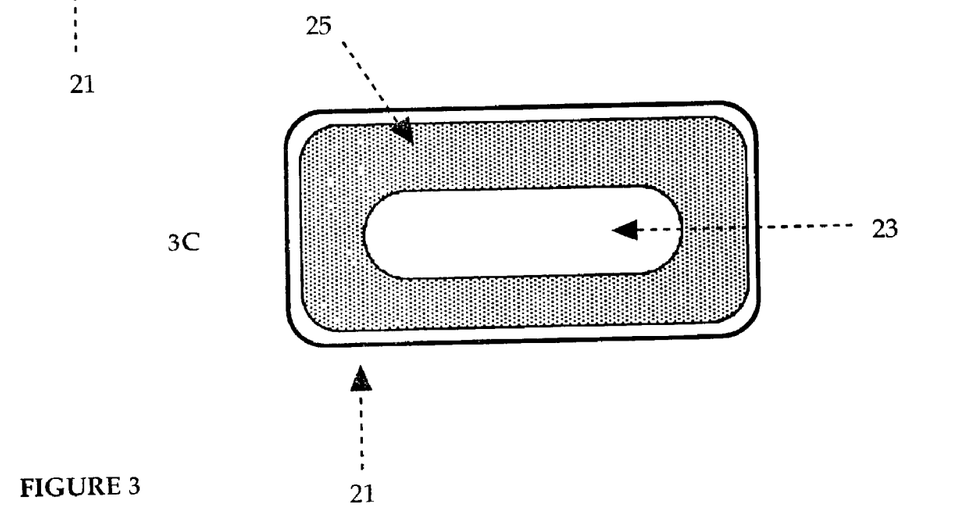

FIG. 3 is a time-sequence 'snapshot' of a single braking display, going from minimal braking effort (FIG. 3A) to serious braking effort (FIG. 3B) to moderate braking effort (FIG. 3C), with the proportion that is illuminated (23) and not illuminated (25) changing to reflect the changing braking effort.

Figure 4:
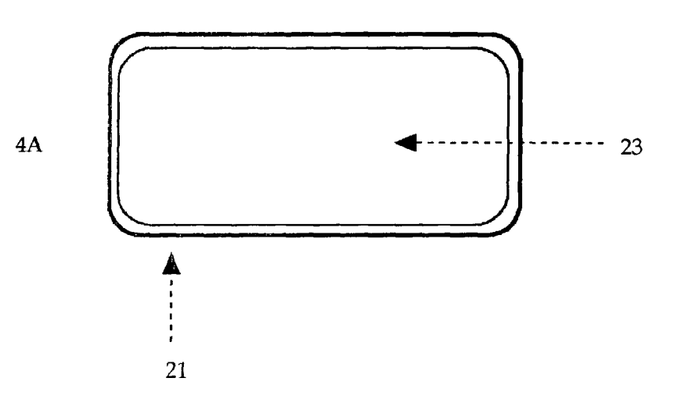
FIG. 4 is a time sequence 'snapshot' of a single braking display when maximal braking effort is employed, showing the outer, circumferential element flashing, on (FIG. 4A), off (FIG. 4B), and on (FIG. 4C).

FIG. 4 is a time sequence 'snapshot' of a single braking display when maximal braking effort is employed, showing the outer, circumferential element flashing, on (FIG. 4A), off (FIG. 4B), and on (FIG. 4C). Note particularly that there is no non-illuminated area (25) in the central element.

Figures 5, 5A, 5B, 5C:
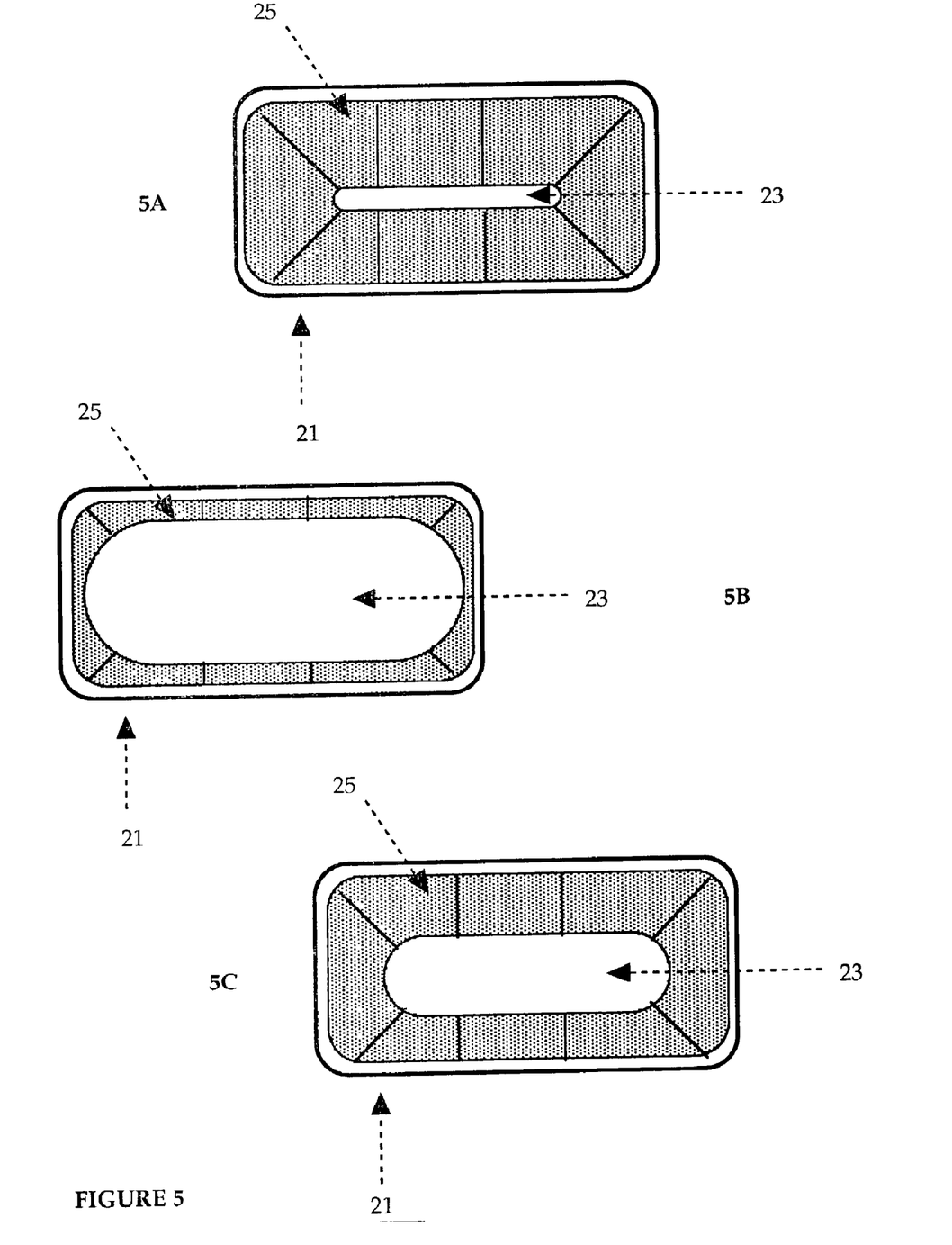

FIG. 5 is another time sequence 'snapshot' of a single braking display, using as an alternative means to vary the amount of illuminated central display a shutter, going from minimal braking effort (FIG. 5A) to serious braking effort (FIG. 5B) to moderate braking effort (FIG. 5C).

Figure 6:
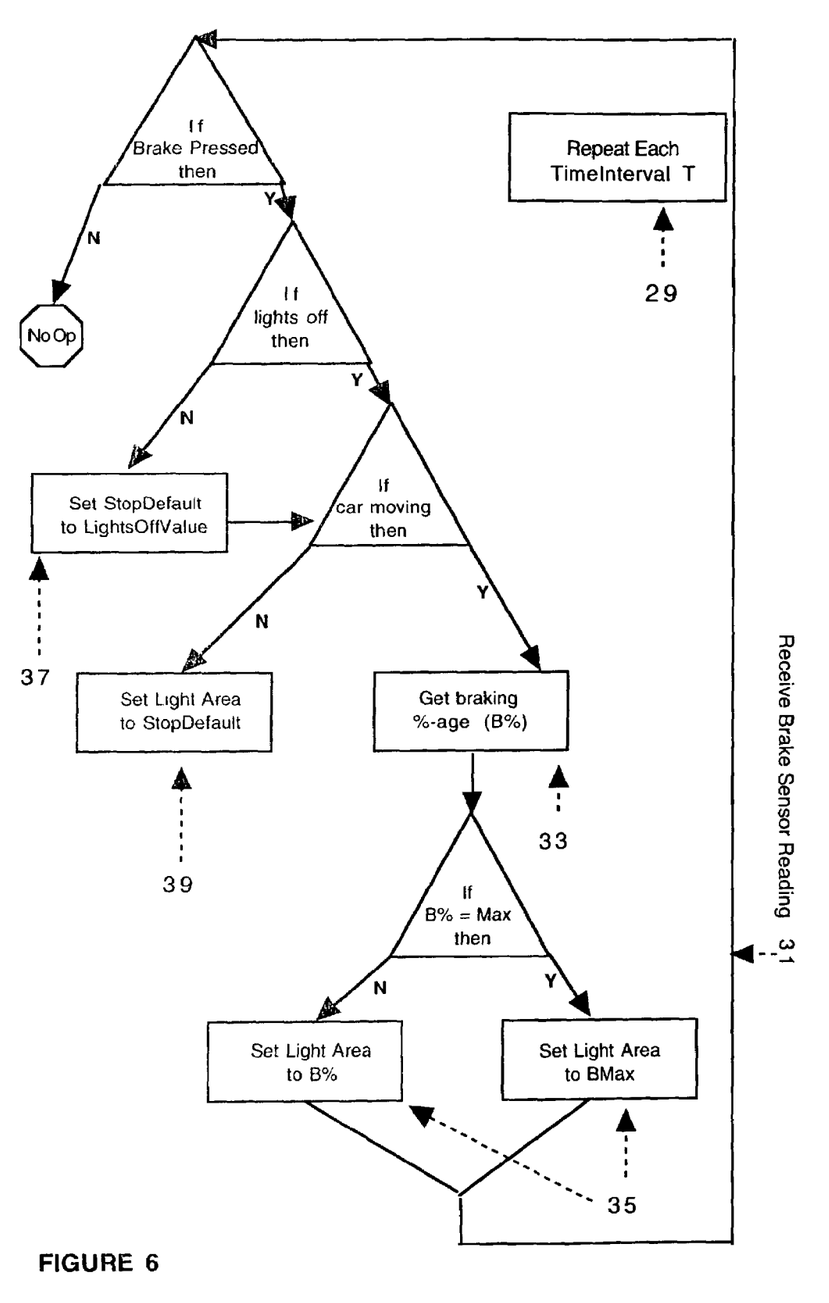
FIG. 6 is a logic flowchart for the circuit governing the area of the braking display to bc illuminated.

FIG. 6 is a flowchart of the general logic used by the logic circuit to transform the sensor reading into value that will determine the area of braking display illuminated. The braking system continually loops, at a time interval T (29) through retrieving the sensor value (31), getting the braking effort value (33) and setting the display area (35), with additional logic steps potentially being included to incorporate information about whether the lights are on (37) or the vehicle is moving (39).

DETAILED DESCRIPTION

Vehicle signal systems, and more particularly braking signals, are currently binary-valued and not responsive to intermediary changes, even though the intention and effort which is being signaled is both analog and variable. In current braking signal systems, the signal is either off (not even the slightest change is intended) or on (anything from the slightest to the maximum possible change is intended). There is no possibility of indicating intermediate values, and no way, especially, to signal changes in the intermediate values, even though such changes may encompass nearly all of the range from 'barely tapping the brakes' to 'hard slam'—or vice-versa, without ever going 'off'. No binary-valued signal about the current motion of a vehicle can help predict the changes that will be caused by that vehicle's operator, as much as can an analog signal made feasible through a sensor and display associated with a control that are proportionately responsive to and change with the intentions and actions of the vehicle's operator.

When a driver sees the brake lights of the car ahead go on, he only knows that that driver has applied the brakes. Perception of the actual behavior of the vehicle, its environment, and of any changes in behavior is continuous and analog; but signals of the leading driver's intentions currently are not. Similarly, when a driver sees another vehicle's turn indicator go on, he only has a cue as to which hemisphere the driver intends to move—but not how sharp or soon the turn will be.

Those seeing such a bimodal signal must then make further visual assessment of the actual change in velocity and moderate their behavior according to their perception. This leaves room for three different classes of error: (1) under-reaction, when the change is greater than initially perceived; (2) overreaction, when the change is less than initially perceived; and (3) mistaken reaction, when the change is based on an initial perception which, however accurate, mistakes performance for intention.

Currently, a driver of a vehicle can signal his intention by activating a signal. When the performance of the vehicle deviates from that intention, the driver is almost always too busy adapting to the change to moderate his signal; particularly when a potential accident is threatened. He also has no way to signal a change in effort other than by stopping and restarting the signal (e.g. flashing his brakes). This means both losing braking time (which may be needed to stop 'in time') and stressing his interim control. A driver currently has no way to signal that a light braking pressure suddenly has turned into an 'emergency stomp', or that a hard braking effort has eased.

The advance from hand signals to bimodal light displays sacrificed the analog variability of the former, for greater consistency across operators and visibility at distances of the latter. Initially, getting a single incandescent filament to turn on and off in conjunction with the control's operation, quickly, reliably and durably, was the chief advance. Then adding multiple displays, reacting identically, improved the chance of being seen and (hopefully) heeded.

Now, however, modern electronics allow more complex signaling to be provided. An illuminated display such as a brake light need no longer just be 'on' or 'off'; it can be 'barely on', 'somewhat on', 'more on', or 'fully on'. Instead of a single incandescent filament, multiple light sources can be provided and patterns generated therefrom to indicate different intentions, different performance, or both. Additionally, variable-frequency lasers or other color-changing means make multiple spectral values (colors) possible. Alternatively, a mechanical shutter can be used to reveal a variable and varying amount of an illuminated display. Any one or combination of these can be made responsive to a sensor attached to the brake pedal, enabling signaling of the proportionate braking effort being applied moment-by-moment. The addition of logic circuits, with memory and comparative means, allow changes to be made in the display without requiring the driver's attention or interrupting his efforts.

In the preferred embodiment of the present invention, a sensor is attached to the brake pedal of a vehicle and detects the proportionate braking effort intended. This sensor will send a value through a logic circuit which has both memory for the current and prior signals, and comparative circuits, which then sends the operative value to the braking display, which value sets the response of the braking display.

When the brake pedal is not depressed, or in the preferred embodiment with the logic circuit, when it is not depressed beyond a minimal threshold (of effort, time, or both), a zero value is sent to the braking display. This avoids the problem of 'false positives' from someone 'riding the brakes', or whose contact was unintentional, inadvertent, or otherwise insufficient to actually change the behavior of the vehicle. When the brake pedal is maximally depressed, a maximal value is sent. When the brake pedal is depressed more than the minimum and less than the maximum, that relative value is sent. This relative value may be directly proportionate or differentially proportionate (e.g. in a bell, skewed, or logarithmic curve) to the effort exerted. And the value of the current effort is continually and rapidly updated so the value for any changes thereof can be sent. Since electronics react faster than human nerves, the updates are made at a rate sufficiently high that to a human observer they are simultaneous with the change in effort.

In an alternative embodiment the logic circuit is also connected to means for detecting if the vehicle is moving (e.g. the speedometer or the axles or a motion sensor) and, if the vehicle is not moving, the braking signal does not change from a value that indicates that the brakes are set; at zero velocity, all braking effort is identical.

The braking display in the preferred embodiment is not a single brake light, but instead is an ordered pattern of light-emitting diodes (LEDs) surrounded by a spectrally different, circumferential, outlining element (which itself may be a single light, or comprised of multiple LEDs). A circuit in the display converts the value sent from the sensor through the logic circuit into the respective activation of the display. In the preferred embodiment when any braking is intended, both that proportion of the LEDs corresponding to the value of the braking effort detected by the sensor, and the spectrally different, circumferential, outlining element are illuminated, to enable any viewer to make an intuitive, analog comparison between the area of the braking display actually illuminated and the total area potentially illuminable, enabling thereby the analog assessment of the proportionate braking effort by including visible outer circumferential perimeter that provides the scale to any observer. This visible outer circumferential perimeter may completely or partially surround the inner area of the display; however, when only a partial circumferential perimeter exists it should be placed where it will effectively establish the maximal bounds, visually, for the inner area (e.g. only the corners may have separate circumferential lighting, or the sides, but never just a top and one side, leaving the person behind guessing how much of the inner area may yet illuminate).

In an alternative embodiment, the braking display comprises at least one inner light, which is covered by a shutter capable of a variable opening (FIG. 5), and in an enhancement, a second, spectrally different, circumferential, outlining element, and an integrated circuit to convert the value sent from the sensor to the respective activation of the display. The extent of the shutter's opening is proportionate to the value from the sensor, and the spectrally different, circumferential, outlining element again provides an innate and visible outer limit to provide the scale to any observer.

If the value for maximal braking effort is sent, a special, differentially-shaded circumferential outlining lighting activation occurs; in the preferred embodiment, this is through rapid on-and-off flashing of just the differentially-shaded circumferential outlining element. If the braking pressure is rapidly varied to avoid 'lock-up', either by the driver or by an on-vehicle antilock braking system (ABS), the entire braking display flashes rapidly and repeatedly as the braking is applied and released.

In yet another variable embodiment, the means for controlling the proportionate illumination is a variable resistor which governs the extent to which the shutter opens, or to which any lighting element illuminates, by increasing and decreasing the current flow to that element in proportion to the signal sent by the sensor through the logic circuit.

In another alternative, the braking signal is comprised of a mixture of LEDs and incandescent lights.

A common problem with many drivers is 'riding the brake', i.e. a constant minimal pressure on the pedal from leaving their foot on the pedal. This produces excessive wear on both the brake and the engine, which must work harder, unintended by the driver. It also overloads the signal to those following the driver's vehicle, often eventually causing them to ignore the brake lights. When this class of driver then applies the brake harder, currently there is no change in the signal sent to those following, leaving them entirely dependent upon sensing the subtler perspective changes that indicate a change in velocity. A further enhancement to the present invention includes both logic and memory for a value needful for minimal effective braking effort to eliminate this problem. Whatever the sensor detects less than the minimal braking effort in the memory, a zero value is sent to the display.

In a further alternative to the preferred embodiment, the integrated circuit includes a memory element containing the value for the minimal light intensity level required by law for effective signals, increases the value sensed by the sensor to that minimum for any effective braking attempt, and re-values the relative proportion of braking effort according to the otherwise-foreshortened relative scale, to produce the legally-constrained relative value of braking display commensurate to the shifted scale.

In a further alternative to the preferred embodiment the braking system is connected to an antilock braking system (ABS) and, whenever said ABS is actuated, the braking signal activates with a particular maximal warning, varying the intensity and duration of the signal according to the intended maximal braking effort desired and sought rather than the actual braking effected against the road surface.

In a further enhancement the integrated circuit in the braking display is linked to a motion sensor and, if the vehicle is not moving, converts any value received from the sensor to the minimal braking value so a constant-value braking display is shown for a non-moving vehicle, to avoid any indication that the vehicle's motion is changing by a change in the braking display.

In a further enhancement the integrated circuit in the braking display is linked to an accelerometer (specifically, a forward-motion accelerometer) and, if the vehicle is not slowing, converts any value received from the sensor to a zero value so no braking is shown for an accelerating vehicle.

In a further enhancement the display is comprised of more than one set of light elements with each set distinct, in location, color, or any combination thereof, to enable further degrees of display complexity and thus of signal density.

The scope of this invention includes any combination of the elements from the different embodiments disclosed in this specification, and is not limited to the specifics of the preferred embodiment or any of the alternative embodiments mentioned above. Individual configurations and embodiments of this invention may contain all, or less than all, of the elements disclosed in this specification. The claims stated herein should be read as including those elements which are not necessary to the invention yet are in the prior art and are necessary to the overall function of that particular claim and should be read as including, to the maximum extent permissible by law, known functional equivalents to the elements disclosed in the specification, even though those functional equivalents are not exhaustively detailed herein.

I claim:

1. A brake signal system for a vehicle, comprising:
    means for detecting a braking effort intended by the operator;
    an outer circumferential perimeter area which is illuminated when any significant braking effort is intended;
    an inner area which is illuminated to an extent proportionate to the braking effort intended
    means for illuminating said display to signal the braking effort;
    and,
    means for varying the area of the display illuminated, according to the braking effort intended by the operator.

2. A brake signal system as in claim 1, wherein the inner area further comprises:
    an ordered pattern of individual lights.

3. A brake signal system as in claim 2, wherein said individual lights are Light Emitting Diodes.

4. A brake signal system, for a vehicle, comprising:
   means for detecting a braking effort intended by the operator;
   a display that can signal a braking effort;
   a circuit for translating a signal from means for detecting a braking effort intended by the operator into activation of an associated portion of the display to signal a braking effort, wherein the circuit for translating a signal from means for detecting a braking effort intended by the operator into activation of an associated portion of the display to signal a braking effort, translates in a logarithmic proportion to the effort applied; and,
   means for varying the area of the display illuminated, according to the braking effort intended by the operator.

5. A brake signal system as in claim 1, wherein said outer circumferential perimeter area flashes repeatedly and rapidly, at intervals between one hundredth of a second and five seconds separating each flash, whenever the means for detecting a braking effort intended by the operator signals a maximal braking effort.

6. A brake signal system for a vehicle, comprising:
   means for detecting a braking effort intended by the operator;
   a display that can signal a braking effort;
   means for illuminating said display to signal the braking effort;
   means for detecting whether the vehicle is accelerating forward; and,
   means for varying the amount of area illuminated according to the braking effort intended by the vehicle operator, further moderated by whether the vehicle is accelerating forward.

7. A brake signal system for a vehicle comprising:
   means for detecting a braking effort intended by the operator;
   a display that can signal a braking effort;
   means for illuminating said display to signal the braking effort;
   means for detecting whether the braking effort has changed;
   means for varying the amount of area illuminated according to the braking effort intended by the vehicle operator, according to the most recent change in braking effort;
   means for recording the most recent change in braking effort against a previous braking effort;
   means for comparing the most recent change in braking effort against a previous braking effort; and,
   means for displaying both the current braking effort and the change from the previous braking effort.

8. A brake signal system as in claim 7, wherein said means for displaying both the current braking effort and the change from the previous braking effort comprise:
   illuminating differently a first and second part of the inner display;
     said first part representing the current braking effort; and,
     said second part representing the previous braking effort.

9. A brake signal system for a vehicle, comprising:
   means for detecting a braking effort intended by the operator;
   means for differentiating a non-effective and unintentional braking effort from an intentional braking effort;
   a display that can signal an intentional braking effort;
   means for illuminating said display to signal the intentional braking effort;
   and,
   means for varying the area of the display illuminated, according to the braking effort intended by the operator.

10. A brake signal system as in claim 9, wherein the means for differentiating a non-effective and unintentional braking effort from an intentional braking effort further comprise:
    a logic circuit with a minimal threshold for an intentional braking effort connected to the means for detecting a braking effort.

11. A brake signal system as in claim 10, wherein said minimal threshold measures the time a braking effort is applied and ignores any effort which is transitory.

12. A brake signal system as in claim 10, wherein said minimal threshold measures the force exerted against the brake pedal and ignores any effort which is less than the weight of an foot just resting on the brake pedal.

13. A brake signal system for a vehicle, comprising:
    a sensor for detecting a braking effort intended by the operator attached to the brake system;
    means for differentiating a non-effective and unintentional braking effort from an intentional braking effort;
    a display that can signal an intentional braking effort, further comprising:
      an outer circumferential perimeter area which is illuminated when any intentional braking effort is intended; and,
      an inner area, comprising an ordered pattern of individually illuminable lights, which pattern is illuminated to an extent proportionate to the intentional braking effort intended;
    a circuit for translating a signal from means for detecting an intentional braking effort by the operator into activation of an associated portion of the inner area to signal a braking effort;
    and,
    means for varying the area of the display illuminated, according to the intentional braking effort by the operator, further comprising:
      means for detecting whether the vehicle is accelerating forward, in motion, has engaged an anti-lock braking system, or is stopped; and,
      means for varying, or not varying, the amount of area illuminated according to the intentional braking effort by the vehicle operator, moderated by the change in braking effort actually feasible.

* * * * *